US008863092B2

(12) United States Patent
Trofin et al.

(10) Patent No.: US 8,863,092 B2
(45) Date of Patent: Oct. 14, 2014

(54) MECHANISM FOR COMPATIBILITY AND PRESERVING FRAMEWORK REFACTORING

(75) Inventors: Mircea Trofin, Redmond, WA (US); Wes Haggard, Kirkland, WA (US); Krzysztof Cwalina, Sammamish, WA (US); David Kean, Kirkland, WA (US); Jobst-Immo Landwerth, Issaquah, WA (US)

(73) Assignee: Microsoft Corporation, Redmond, WA (US)

(*) Notice: Subject to any disclaimer, the term of this patent is extended or adjusted under 35 U.S.C. 154(b) by 329 days.

(21) Appl. No.: 13/024,576

(22) Filed: Feb. 10, 2011

(65) Prior Publication Data
US 2012/0210300 A1 Aug. 16, 2012

(51) Int. Cl.
*G06F 9/44* (2006.01)

(52) U.S. Cl.
CPC ........................................ *G06F 8/72* (2013.01)
USPC .......................................................... 717/128

(58) Field of Classification Search
None
See application file for complete search history.

(56) References Cited

U.S. PATENT DOCUMENTS

| | | | |
|---|---|---|---|
| 6,804,682 B1 | 10/2004 | Kemper | |
| 6,807,548 B1 | 10/2004 | Kemper | |
| 7,770,202 B2* | 8/2010 | Brumme et al. | 726/1 |
| 8,473,442 B1* | 6/2013 | Deninger et al. | 706/47 |
| 2005/0102649 A1* | 5/2005 | Hogg et al. | 717/100 |
| 2006/0015450 A1* | 1/2006 | Guck et al. | 705/39 |
| 2006/0242104 A1* | 10/2006 | Ellis et al. | 707/1 |
| 2007/0039010 A1* | 2/2007 | Gadre | 719/328 |
| 2009/0125878 A1* | 5/2009 | Cullum et al. | 717/106 |
| 2010/0229163 A1* | 9/2010 | Rolland | 717/159 |
| 2011/0004599 A1* | 1/2011 | Deninger et al. | 707/747 |

OTHER PUBLICATIONS

Eisenbach, "Keeping Control of Reusable Components", Proceedings of Component Deployment, May 2004.*
http://web.archive.org/web/20081018045123/http://msdn. microsoft.com/en-us/library/ms404275.aspx "Type Forwarding in the Common Language Runtime", Oct. 18, 2008.*
Anders Aaltonen, et. al; Flexible Dynamic Linking for.NET, 2006.
William F. Opdyke, Refactoring Object-Oriented Frameworks, 1992.
Type Forwarding in The Common Language Runtime, Nov. 1, 2010.
.NET Framework 1.1 Provides Expanded Namespace, Security, and Language Support for Your Projects, Mar. 2003.
Running Multiple Versions of the Framework in ASP.NET, Jan. 26, 2006.

* cited by examiner

*Primary Examiner* — Don Wong
*Assistant Examiner* — Daxin Wu
(74) *Attorney, Agent, or Firm* — Kevin Sullivan; Kate Drakos; Micky Minhas

(57) ABSTRACT

The subject disclosure relates to enabling the evolution of a framework by providing public surface area factorings for both old and new public surface areas. The factoring can mitigate changes in the implementation of existing distributions of framework. The factoring can also mitigate breaking existing binaries. Further, the factoring can be provided while mitigating a degradation in the security guarantees of the linking model. The factorings can be applied for runtime and/or for a development toolkit. Thus, multiple, almost simultaneous, interoperable views of a framework implementation can be enabled at runtime and/or at design or build time. The views can represent different versions of the framework.

20 Claims, 13 Drawing Sheets

RunTime Setup 910

Compile Time Setup 920

MECHANISM FOR COMPATIBILITY AND PRESERVING FRAMEWORK REFACTORING

TECHNICAL FIELD

The subject disclosure generally relates to frameworks that utilize type forwarding to support both legacy and new public surface areas while mitigating changes in the implementation of existing distributions of framework, breakage of existing binaries, or degradation of security guarantees of a linking model.

BACKGROUND

As computing technology advances and computing devices become more prevalent, computer programming techniques have adapted for the wide variety of computing devices in use. For instance, program code can be generated according to various programming languages to control computing devices ranging in size and capability from relatively constrained devices such as simple embedded systems, mobile handsets, and the like, to large, high-performance computing entities, such as data centers or server clusters.

Conventionally, as applications are being developed and/or modified for use with computing devices, there might be older (legacy) frameworks (e.g., a reusable set of libraries or classes) that are useful. However, due to size constraints (e.g., processing power, memory capacity, screen size, and so forth) on some devices (e.g., portable devices such as cell phones), the existing frameworks might not be able to be used successfully on such devices. Therefore, the framework is rewritten or a new framework is created for use with the lower capability devices, which increases costs and consumes time and other resources in order to create and/or modify frameworks.

Such challenges exist in frameworks that feature a framework-level component model where the framework is split across different units that can be distributed and consumed independently. Furthermore, the problem can be particular to strongly typed frameworks, where type identity is tied to the component in which the type is defined.

Consequently, there is no system today that properly supports the evolution of a framework by, at substantially the same time, offering both old (legacy) and new public surface area factorings while mitigating the amount of changes needed in the implementation of existing distributions of framework, or that enables such evolution of a framework without breaking existing binaries. Further, no such system today enables the framework evolution without degradation in the security guarantees of a linking model.

The above-described deficiencies of today's computing system and framework system techniques are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

In one or more embodiments, for each surface area design, a framework development system creates a set of reference assemblies, wherein each reference assembly has a different identity, e.g., no two assemblies have the same identity, regardless of the set to which the assemblies belong. Further, the framework development system can comprise adapters that are provided at runtime. There can be one adapter per new reference assembly. The adapters are configured to forward requests for types in a new surface area to types in actual implementation assemblies. Further, the framework development system can comprise other adapters (similar to the above mentioned adapters) for a developer toolkit. Such other adapters are configured to correctly type check projects referencing different surface areas.

Further, the disclosed embodiment comprises a type forwarding notion that is understood by both runtime and compilers, which can support multiple factorings of a framework, which can be supported at substantially the same time. The disclosed aspect also enable multiple, almost simultaneous, interoperable view of a framework implementation at runtime and/or at design/build time. The interoperable view may represent different versions of the framework (e.g., similar mechanism may be used for versioning). Also provided is a linking security guarantees that are not weakened when compared to a current, to-implementation linking models.

These and other embodiments are described in more detail below.

BRIEF DESCRIPTION OF THE DRAWINGS

Various non-limiting embodiments are further described with reference to the accompanying drawings in which.

DETAILED DESCRIPTION

Overview

Figure 1:
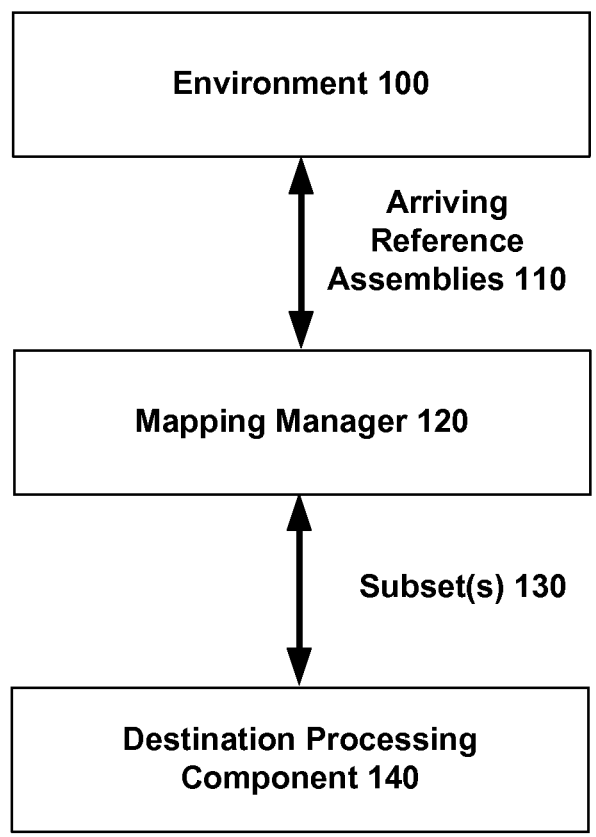
FIG. 1 is a block diagram of an exemplary computing system, according to an aspect.

When a designer creates an operating system, for example, the designer creates frameworks, which can comprise a reusable library, a set of libraries or classes for a software system (or subsystem). The library (or set of libraries) can be large and can support several programming languages. The framework can comprise a common language infrastructure that provides a language-neutral platform for application development and execution. Code for the common language infrastructure can be contained in assemblies. Each assembly comprises one of more files and metadata for the assembly. The complete name of the assembly contains a simple text name for the assembly, version number of the assembly, and public key token, as well as other information. When the assembly is complied, a unique hash is generated, creating the public key token. Therefore, two assemblies that contain the same public key token are identical from framework's perspective. Further, the common language infrastructure is described through metadata, which can contain information about the assembly, as well as other information.

The framework might also have security mechanisms that provide at least two functions, which comprise code access security and validation and verification. Code access security can determine permissions granted to the code and can restrict access if an assembly is not granted permission to the code. During validation, a check is performed to see if the assembly contains valid metadata, as well as other checks. Verification is performed to determine whether the code is doing something it should not be doing and restricts the code if there is a problem with what the code is attempting.

A challenge associated with frameworks is that refactorings that impact public surface area can break compatibility. Factoring, as used herein, refers to the organization (or grouping) of public Application Programming Interfaces (APIs) in assemblies, as perceived by a third party developer.

Thus, it would be beneficial to enable the evolution of a framework by offering both old and new public surface area factoring, at substantially the same time, without the need for changes to be made in the implementation of existing distributions of framework, without breaking existing binaries, and without degradation in the security guarantees of the linking model.

In an embodiment, two or more factorings are offered at substantially the same time. For the runtime, for each assembly in a particular factoring, as assembly (e.g., "type forwarding facade") is provided. The assembly comprises only type forwarders to one or more implementation assemblies where the APIs are actually implemented. For the development toolkit, reference assembly sets ("targeting packs") are created to represent each factoring. If it is desired to allow binaries targeting some factoring "F1" to reference binaries that target some other factoring ("F2"), then included with the F1 targeting pack reference assemblies with F2 identities, but containing type forwarders to types in the F1 reference assemblies.

In one embodiment, a framework refactoring system is provided. The framework refactoring system comprises a mapping manager component configured to obtain a portion of an original assembly based on one or more reference assemblies. The framework refactoring system also comprises a destination processing component configured to determine a destination assembly using the portion of the original assembly.

In an example, the mapping manager component utilizes at least one type forward to obtain the portion of the original assembly. In another example, the at least one type forward comprises at least one facade or at least one reverse facade. In a further example, the at least one type forward comprises one or more facades that hide factoring of types during run time.

The system, in another example, further includes a platform type identifier configured to selectively apply the portion of the original assembly as a function of a platform on which the destination assembly is to execute. In a further, example, the portion of the original assembly is at least a type of the original assembly, a subset of the type, or combinations thereof.

In another example, the system further includes an observer component configured to determine the type or the subset is not executed by the destination assembly. The destination processing component does not deliver the type or the subset at a next execution of the destination assembly.

The system, in still another example, includes an observer component configured to monitor usage of the type or the subset by the destination assembly. The destination processing component selectively delivers the type or the subset as a function of the usage.

In another example, the system includes a leverage component configured to identify common subsets of the original assembly to enable support across different platforms. In some examples, the system includes a matching identity component configured to detect facades that allow for reuse of a library, source code, or other element of the original assembly. In a further example, the mapping manager component obtains two portions of the original assembly from different implementation assemblies.

In another embodiment, a method for preserving framework refactoring is provided. The method includes creating a set of reference codes associated with a first assembly. The method also includes associating a plurality of adapters to the set of reference codes, wherein the plurality of adapters forward requests for types of the first assembly. Further, the method includes supplying the plurality of adapters during execution of a second assembly.

In an example, the creating comprises generating a different identity for each reference code in the set of reference codes. In another example, the supplying comprises supplying the plurality of adapters at runtime. In a further example, the associating comprises referencing each adapter to a different surface area and the supplying comprise supplying the plurality of adapters at compile time. In another example, the supplying comprises monitoring a usage of the set of reference codes and selectively providing a subset of the set of reference codes as a function of the usage.

Another embodiment relates to a method for framework refactoring compatibility. The method comprises obtaining at least a portion of an original assembly based on one or more reference assemblies. The method also comprises determining, e.g., generating or obtaining, a destination assembly using the portion of the original assembly, wherein the portion comprises a type, a subset, or combinations thereof.

In an example, the method further includes utilizing at least one type forward to obtain the portion of the original assembly. The method, in another example, can further include detecting at least one facade that allows reuse of a library, source code, or other element of the original assembly, wherein the utilizing comprises utilizing at least one facade. In a further example, the method includes identifying at least one common subset of the original assembly and enabling support across at least two platforms.

Herein, an overview of some of the embodiments for framework systems has been presented above. As a roadmap for what follows next, various exemplary, non-limiting embodiments and features for framework systems are described in more detail. Then, some non-limiting implementations and examples are given for additional illustration, followed by representative network and computing environments in which such embodiments and/or features can be implemented.

Mechanism for Compatibility and Preserving Framework Refactoring

By way of further description with respect to one or more non-limiting ways to provide compatibility and preserve framework refactoring, a block diagram of an exemplary computing system is illustrated generally by FIG. 1. The computing system includes an environment 100, which can be a development environment or a runtime environment. The environment 100 can include assemblies from which other assemblies can be compiled. For instance, a first or original assembly can be referenced in a second or destination assembly. The reference to the original assembly can mitigate the need to recompile the original assembly, which can conserve time during both design and execution of the destination assembly as well as conserving other resources (e.g., system processing, memory, and so forth).

The selection of an assembly can be provided as input in the form of one or more arriving reference assemblies 110 (e.g., a destination assembly references at least a portion of an original assembly). In accordance with some aspects, each reference assembly has a different identity. According to some aspects, each reference assembly can operate as a facade (or a reverse facade) that is associated with an implementation.

A mapping manager component 120 is configured to receive the one or more arriving reference assemblies 110 and selectively provide the implementation by obtaining one or more subsets 130 of the original assembly. In accordance with an aspect, each of the one or more subsets 130 comprises at least a portion of a type, wherein each assembly comprises one or more types. Each of the subsets 130 can be located in different storage medias, thus, the mapping manager component 120 is configured to determine a location from where each of the subsets can be obtained. In accordance with some aspects, the mapping manager component 120 is configured to obtain two portions (or more portions) of an original assembly from different implementation assemblies.

To facilitate obtaining the one or more subsets from the original assembly (or more than one assembly), the mapping manager component 120 can utilize at least one type forward (type forwarding), according to an aspect. Type forwarding allows for the forwarding (or movement) of types from one assembly to another assembly. Such forwarding (or moving) can occur without the need to recompile applications that use the original assembly. In accordance with some aspects, adapters are utilized to forward requests for types in a new surface area to types in actual implementation assemblies. The type forward can comprise at least one facade or at least one reverse facade. In accordance with some aspects, the type forward comprises one or more facades that hide factoring of types during run time.

There are a few steps related to forwarding a type. For example, the source code for the type is moved from the original assembly to the destination assembly. In the original assembly, an attribute (e.g., TypeForwardedToAttribute) is added for the type that was moved. For example, the following codes (for C# and for Visual C++) show the attribute for a type named "Example" that was moved.

C#:
   [assembly:TypeForwardedToAttribute (typeof (Example))]

Visual C++:
   [assembly:TypeForwardedToAttribute (Example::typeid)]

The assembly that now contains the type (e.g., destination assembly) is complied. The original assembly (where the type used to be located) is recompiled with reference to the destination assembly that now contains the type.

With continuing reference to FIG. 1, a destination processing component 140 is configured to generate the destination assembly using one or more of the received subsets 130. In an example all of the subsets are received, however, the destination assembly is generated without one or more of the received subsets 130 as a function of a platform on which the destination assembly is to be executed. For example, if the platform is a cellular phone, the platform might not have the processing capabilities to run certain portions of the original assembly and, if those portions are not needed to successfully execute the destination assembly, those portions are not delivered to the cell phone and/or are delivered but are not executed on the device. Since the portions that are needed to successfully execute the destination assembly are delivered to (or executed on) the cell phone, there is no adverse impact to the user experience. In another example, if the platform is a desktop computer that has a relatively large amount of processing capabilities, all subsets or portions (e.g., types) might be delivered and executed on the desktop computer platform.

The executed (destination) assembly can be output to a user in any perceivable format for performing functions associated with the assembly. If only a subset of the assembly was delivered, the user is not aware (e.g., the assembly performs as expected).

In accordance with some aspects, security is enabled whereby security of an assembly identity is verified and changes to an original assembly are restricted. In some aspects, if a destination assembly is referencing one or more original assembly, a verification can be performed to determine whether to information contained in the original assemblies will operate as expected. If there is no positive verification, one or more of the original assemblies can be restricted from being executed in order to help preserve system integrity.

In an embodiment, the framework system illustrated by FIG. 1 can differ in operation from a conventional framework system in order to provide additional benefits over those achievable by computing systems that employ conventional framework systems. For instance, the framework system disclosed herein can be applied at both runtime and during development.

Figure 2:
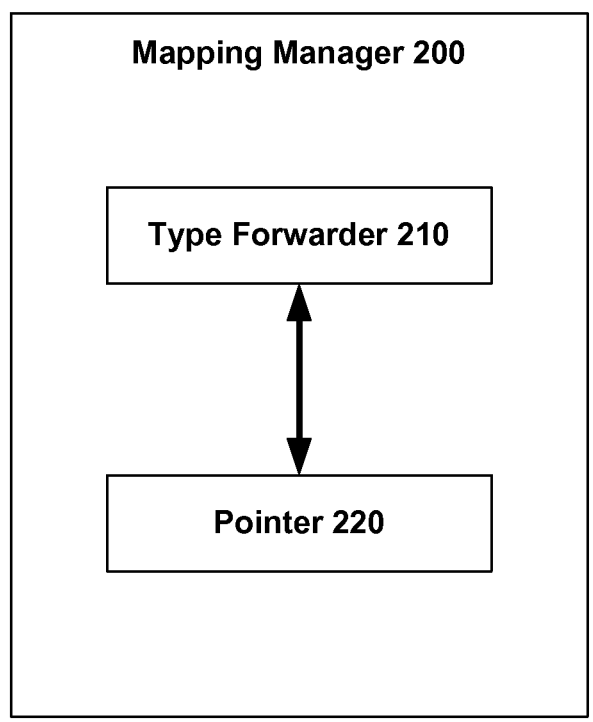
FIG. 2 is a block diagram of a mapping manager component, according to an aspect.

Illustrating other aspects, FIG. 2 is a block diagram showing a mapping manager component 200 containing a type forwarder component 210 and a pointer component 220. In one embodiment, type forwarder component 210 is configured to create one or more reference assemblies. Each reference assembly has a different identity. Therefore, no two assemblies should have the same identity, regardless of the set to which the assemblies belong. The reference assemblies can enable facades (or reverse facades) that can be utilized in place of an actual implementation.

For example, when a program is compiled, an original assembly can be created. In accordance with some aspects, the original assembly can comprise an extension, such as a .dll extension, or another mechanism for identifying the original assembly. The original assembly can be defined with enough information so that other assemblies (e.g., one or more destination assemblies), systems, components, and so forth, can observe and consume the information contained in the original assembly. For example, each original assembly (and destination assembly) can comprise one or more types or classes, code (e.g., binary code), and other information related to what methods or functionalities the assembly utilizes. Through utilization of the information, other systems, components, assemblies, and so forth can be made aware of what needs to be utilized (e.g., storage medias and so forth) to successfully execute the destination assembly.

Figure 3:
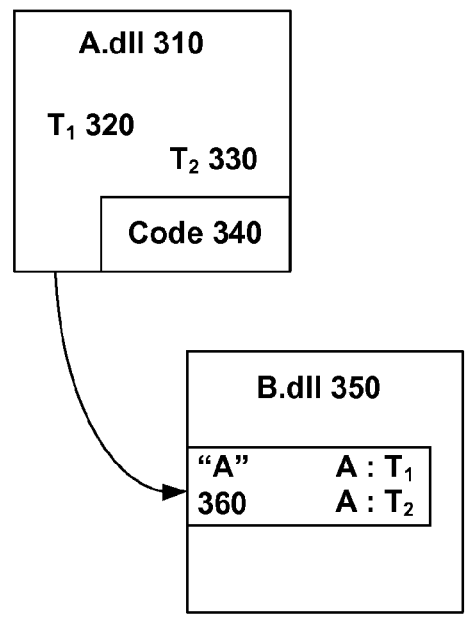
FIG. 3 is a non-limiting example of utilization of an original assembly by a destination assembly, in accordance with an aspect.

A non-limiting example of a utilization of an original assembly by a destination assembly is illustrated in FIG. 3. An original assembly 310 ("A.dll") can comprise two or more types, which are illustrated as a first type (Type $T_1$ 320) and a second type (Type $T_2$ 330). Original assembly 310 also includes code 340, such as binary code. Also illustrated is a destination assembly 350 ("B.dll") that is developed or created to include at least a portion 360 of the original assembly 310. Thus, a portion 360 of the format of destination assembly 350 indicates (or references) at least a portion of original assembly 310. That portion 360 (or more than one portion of original assembly) is utilized by destination assembly 350 to execute properly.

Thus, destination assembly 350 refers to Type $T_1$ 320 and Type $T_2$ 330. However, in order to specify the assembly from which to pull Type $T_1$ 320 and Type $T_2$ 330, the format can be defined with a notation, such as $A:T_1$ and $A:T_2$, to indicate the original assembly 310 and its two types, Type $T_1$ 320 and Type $T_2$ 320.

When the destination assembly 350 is to be executed, the environment (e.g., environment 100 of FIG. 1) at runtime searches for $A:T_1$ and $A:T_2$, and utilizes hysteresis or other techniques to find the references ($A:T_1$ and $A:T_2$).

For purposes of this example, the information contained in $A:T_1$ is utilized frequently. However, the information contained in $A:T_2$ is very large and is not utilized very often or only a subset of the information in $A:T_2$ is utilized (or is utilized at a higher frequency than another subset of information contained in $A:T_2$). Thus, in accordance with some aspects $A:T_2$ can be subdivided or broken into smaller subsets.

Figure 4:
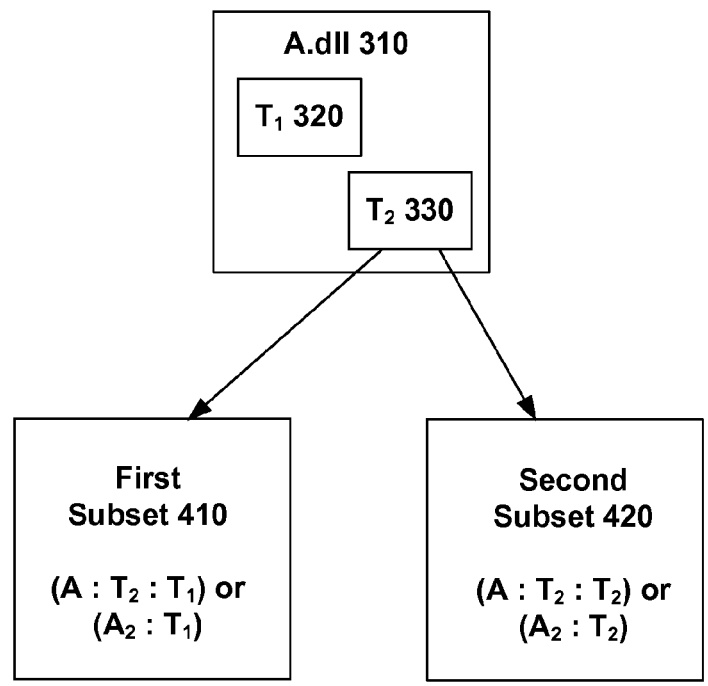
FIG. 4 illustrates dividing assembly types into smaller subsets.

The dividing of assembly types into smaller subsets is illustrated in FIG. 4, where an original assembly 310 ("A.dll") comprises two types, illustrated as type $T_1$ 320 and a type $T_2$ 330. As noted above, type $T_2$ 330 is divided into two subsets, illustrated as first subset 410 (referred to as "$A:T_2:T_1$" or "$A_2:T_1$") and a second subset 420 (referred to as ""$A:T_2:T_2$" or "$A_2:T_2$"). By breaking the large type (Type $T_2$ 330) into smaller pieces, the subsets can be selectively delivered to an executing assembly (e.g., destination assembly 350 of FIG. 3) based on the need for the type (Type $T_2$ 330) and/or a subset contained therein (e.g., first subset 410, second subset 420, and so on).

For example, if first subset 410 is utilized almost all of the time or frequently, first subset 410 can be delivered to the destination assembly (e.g., destination assembly 350 ("B.dll")) each time the destination assembly is executed. However, if second subset 420 is not used (or used only occasionally), second subset 420 does not need to be delivered to the destination assembly each time the destination assembly is executed. Thus, first subset 410 can be delivered each time the destination assembly is compiled and second subset 420 can be delivered less often (e.g., every other time, periodically, when an update has occurred, or based on other time intervals and/or criteria). In another example if the second subset 420 is used periodically, second subset 420 can be delivered to the destination assembly periodically. Thus, if 80% of the time the destination assembly 350 does not need the second subset 420, there is no need to deliver the second subset 420 to the assembly each time the assembly is compiled.

In accordance with some aspects, the different types (e.g., Type $T_1$ 320, Type $T_2$ 330) and/or the different subsets (e.g., first subset 410, second subset 420) are located in different storage medias or in other locations. In an example, type $T_1$ 320 can be located in a different storage media than the storage media in which Type $T_2$ 330 is located. For example, Type $T_1$ 320 can be delivered to the destination assembly 350 and included in Type $T_1$ 320 can be a marker or other indicator that provides information as to where Type $T_2$ 330 can be located (e.g., computer, storage media, and so forth). Additionally or alternatively, Type $T_2$ 330 comprises a marker that indicates the location of Type $T_1$ 320. In another example, first subset 410 can be retained in a first storage media and second subset 420 can be retained in a second storage media, wherein first subset 410 contains a marker that points to second subset 420 and/or second subset 420 contains a marker that points to first subset 410. Thus, type forwarder component 210 (of FIG. 2) can selectively access a storage media to obtain one or more types and/or one or more subsets.

The marker or other indicator can be utilized by the pointer component 220 (of FIG. 2) of the mapping manager component 200 to obtain the type, as needed. Thus, pointer component 220 is configured to obtain a location indicator of one or more types and selectively obtain the type as a function of the location indicator. In accordance with some aspects, pointer component 220 obtains all the types (e.g., from one or more storage medias), without regard to whether the types are to be utilized by the destination assembly, and passes the types to a destination processing component. The destination processing component can selectively apply the types, as will be described in further detail below.

Figure 5:
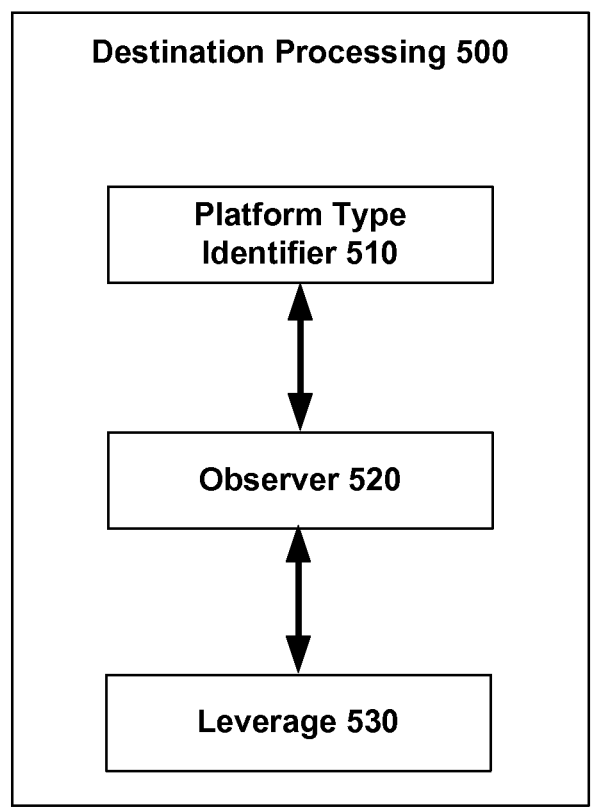
FIG. 5 is a block diagram showing a destination processing component, according to an aspect.

Illustrating other aspects, FIG. 5 is a block diagram showing a destination processing component 500 containing a platform type identifier component 510, an observer component 520, and a leverage component 530. In one embodiment, platform type identifier component 510 is configured to selectively apply one or more types and/or one or more subsets of a type as a function of a platform and/or device on which a destination assembly is to be executed.

Thus, in accordance with some aspects, the application of the type forwarding can be selective as a function of a type of platform (or device) on which the assembly is being compiled. For example, a cell phone typically has less processing and storage capability than a full desktop computer. Thus, if the assembly is to be executed on the cell phone, one or more types (e.g., type $T_2$ 330) might not be forwarded to the destination assembly in order to conserve processing and memory capabilities of the cell phone. However, if the destination assembly is to be executed on a full desk top computer (or another device with a large amount of processing capabilities), one or more types (e.g., type $T_2$ 330), or all types, might be delivered since processing and memory capacity are generally not a concern on a computer.

In another example, there are two functions to implement (e.g., addition and multiplication). Execution of the assembly can be performed differently on different platforms and/or devices as a function of the type and/or number of functions to implement. For example, the implementation can be applied in a first manner on a cell phone and in a second manner on a computer, wherein the second manner is different from the first manner. Further, the implementation can be conducted differently if only one of the functions is to be implemented (e.g., just an addition function, just a multiplication function, and so forth) as compared to if more than one function is to be implemented. The support of one or more functions can be performed differently based on performance, efficiency, or for other reasons.

Figure 6:
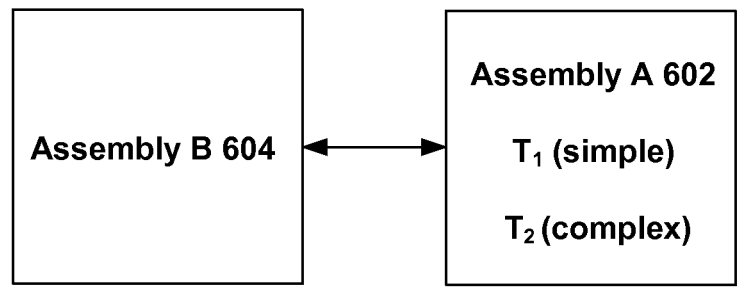
FIG. 6 shows block-diagrams of assemblies, in accordance with an aspect.

Thus, there can be types and/or subsets that are conceptually separate (e.g. strings, instantiations, and so forth). For example, as illustrated by block-diagrams of assemblies in FIG. 6, there can be a first assembly (Assembly A 602) and a second assembly (Assembly B 604). Assembly A 602 can comprise two (or more) types, $T_1$ and $T_2$, wherein $T_1$ is simple and $T_2$ is complex. $T_1$ and $T_2$ are separately consumable, and, therefore, can be supported separately and/or can be implemented together. An advantage of being able to support each type separately and/or together is that is one feature (e.g., type $T_1$) might be more basic (or simple) than a second feature (e.g., type $T_2$). Further, there can be libraries that only need one of the features (e.g., type $T_2$) and not the other feature (e.g., type $T_1$). Thus, those libraries can operate as needed without affecting the other feature(s). Thus, in accordance with various aspects, engineering efficiencies can be supported. For example, there can be a difference between what is being implemented and what is actually being consumed.

Continuing this example, if Assembly A 602 were not broken into types and/or subsets (as described above), and Assembly B 604 only uses Type $T_1$, there would be no manner in which Assembly B 604 could express that it is only using Type $T_1$. Instead, Assembly B 604 would only be able to express that it is using Assembly A 602. Thus, platform type identifier component 510 can be configured to analyze the assembly that is to be executed (e.g., Assembly B 604) and the platform on which the assembly is to execute and determine whether the assembly can be executed on the platform.

Figure 7:
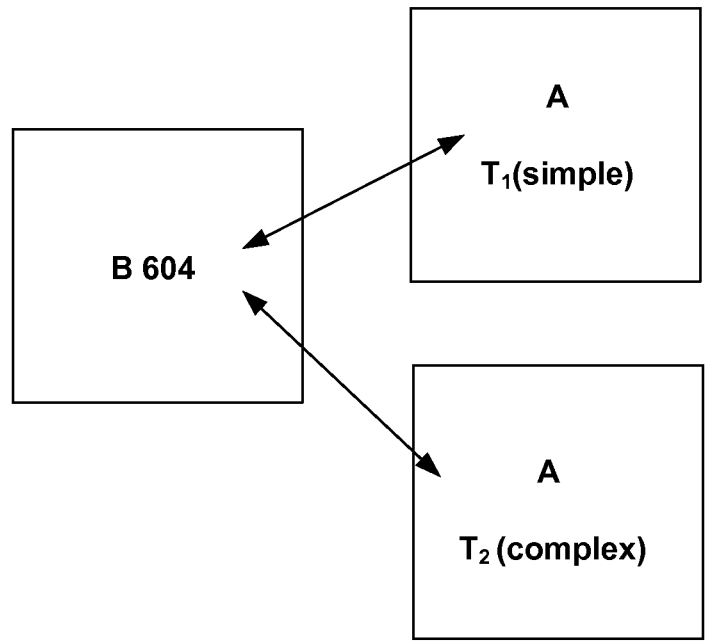
FIG. 7 shows block-diagrams of an assembly of FIG. 6 divided into subsets, according to an aspect.

For example, the platform is a small device with limited performance capabilities (e.g., cell phone) and Assembly A 604 is needed. In this case, the entire assembly A (which contains $T_1$, which is very simple, and $T_2$, which is complex) would be sent to the cell phone. In this case, Assembly A 604 would not work and/or would not operate correctly. However, in accordance with the disclosed aspects, Assembly A 604 can be divided into types and/or subcomponents, as show in FIG. 7, and platform type identifier component 510 can evaluate Assembly A 604 and the platform (e.g., cell phone) and determine what is needed in order for Assembly A 604 to execute properly.

Thus, though utilization of the disclosed aspects, it can be known whether Assembly B 604 needs Type $T_1$, Type $T_2$, or both Type $T_1$ and Type $T_2$. For example, if the assembly that is to execute on the cell phone is Type $T_1$, the assembly can execute because $T_1$ is simple. However, if Assembly B 604 references Type $T_2$, the assembly might not be able to successfully execute on the cell phone because $T_2$ is too complex for the cell phone platform. Thus, the disclosed aspects can determine whether an assembly can execute on a platform (or not). If the platform cannot support the assembly, the assembly will not execute and/or will not be delivered to the platform. In an example, an error message can be rendered (e.g., on a display, though audio means, or in another perceivable format) to inform a user of the device that the function cannot be provided.

In accordance with some aspects, the observer component 520 is configured to evaluate whether one or more types and/or one or more subsets is utilized. Further, the observer component 520 can monitor the usage of the types and/or subset and ascertain how often such types and/or subsets are utilized. For example, upon execution of an assembly, the run type will search for a type (e.g., type $T_2$ 330) and deliver the type to the device. The observer component 520 can evaluate the type and/or its subsets and monitor whether (or not) the particular type and/or subset is being utilized. If there is no use for the type and/or subset (e.g., Subset C, for example), the next time the assembly is executed, Subset C might not be delivered to the device, which can conserve resources and mitigate the amount of time needed to execute the assembly.

In accordance with some aspects, if the observer component 520 determines that a type or a subset is not executed by a destination assembly, the information can be provided to a destination processing component. At a next execution of the destination assembly, the destination processing component does not deliver the type or the subset as a function of the information received from observer component 520.

In accordance with some aspects, the leverage component 530 is configured to obtain one or more types and/or one or more subsets of the types, associated with an original assembly. According to some aspects, the leverage component 530 can be configured to leverage assemblies supported by other platforms in order to provide additional capabilities. Thus, the leverage component 530 can be configured to identify common subsets and where the capabilities of such subsets can be found (e.g., in which storage media). In an example, a math program can support simple equations (e.g., 1+1=2). However, some math programs might not support complex equations (e.g., integrals). The disclosed aspects can support such programs in a less expensive manner by selectively forwarding types across assemblies on an as-needed basis, as determined by leverage component 530. Thus, a platform with limited capacity can utilize at least one component of a platform that has more capacity.

For example, one or more assemblies might include a reference to something that is common across the assemblies. For example, if one or more assemblies are related to a mathematical function, a common attribute can be addition functions (e.g., 1+1=2), which can be supported on a wide variety of platforms and/or devices. However, a platform and/or device with limited capabilities might not be able to support the more complex functions. Therefore, the leverage component 530 can utilize a portion of mathematical function that is supported by a platform and/or device that has the capability to process the more complex function. Thus, the disclosed aspects can provide support across multiple platforms, regardless of the size of the assembly that is to be utilized to perform functions on the platform.

Figure 8:
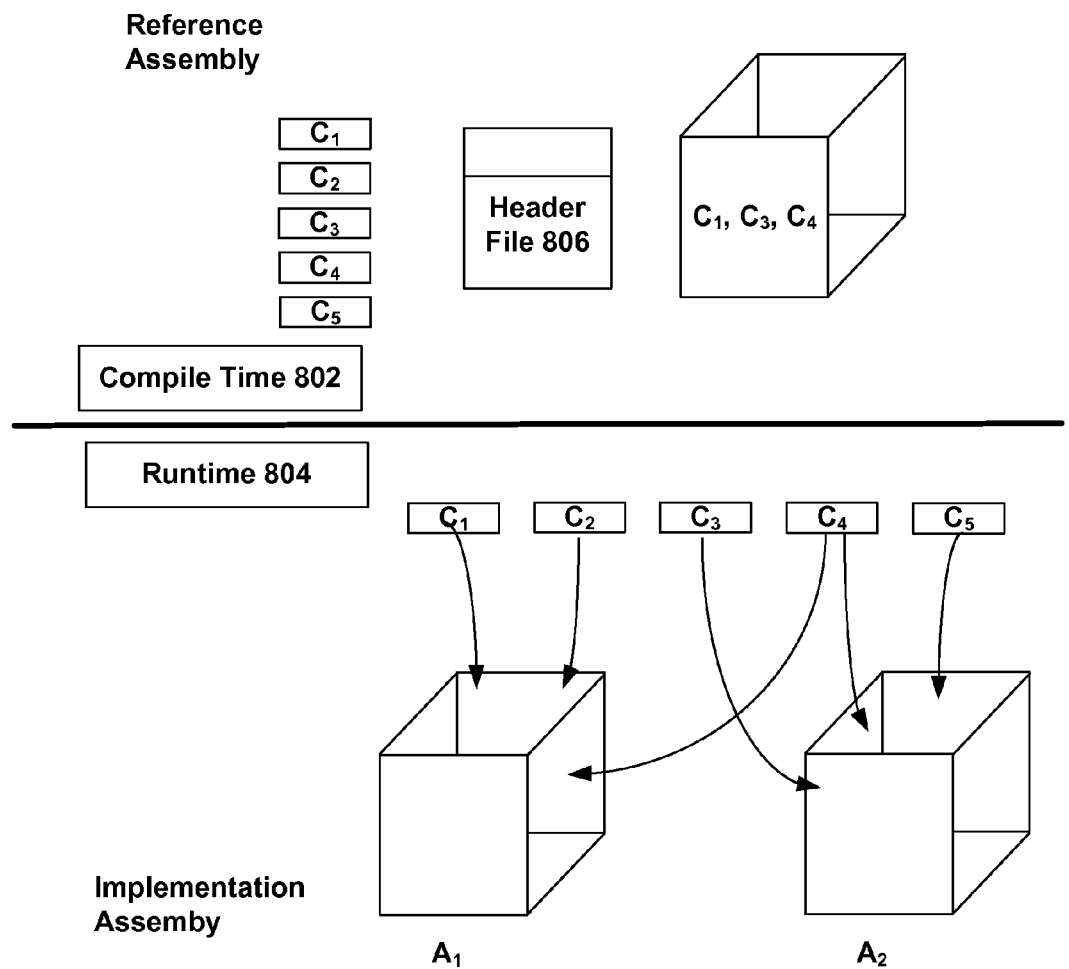
FIG. 8 is a block-diagram of an assembly that references a first element, which is satisfied by using a second element, according to an aspect.

To provide further context, FIG. 8 illustrates a block-diagram of an assembly that references a first element, which is satisfied by using a second element, according to an aspect. In accordance with some aspects, provided is a mechanism (e.g., pointer component 220 of FIG. 2, leverage component 530 of FIG. 5) that allows developers and/or third parties to reference one element (e.g., one particular factorization) and satisfy the element (e.g., the factorization) in a different manner for each of the different devices and/or platforms (e.g., based on engineering requirements, based on device revision level, and so on). For example, the factorization can be satisfied in a first manner for a legacy device and can be satisfied in a second manner for a device having an updated revision level.

For example, as shown in FIG. 8, compile time 802 is represented above the solid line and runtime 804 is represented below the solid line. When source code is written during compile time 802, the source code refers to various reference assembly codes, represented as $C_1$, $C_2$, $C_3$, $C_4$, and $C_5$. These reference assemblies can be similar to a C++ header file 806, according to an aspect. The program is complied against the reference assemblies, but it is not compiled against actual assembly.dll or other implementations. During compile time 802, the user can forward declare all the types that will be used. Further, the header file 806 might not contain executable code but might contain the APIs that can be called (but might not indicate what would occur if the APIs were actually called).

The reference assembly codes ($C_1$, $C_2$, $C_3$, $C_4$, and $C_5$) have the same identity as the assembly that is loaded (or attempted to be loaded) during runtime 804. In accordance with some aspects, the reference assembly codes ($C_1$, $C_2$, $C_3$, $C_4$, and $C_5$) are similar except the reference has no executable code, but simply contains metadata that describes the types.

At compile time 802, the header file 806 will point to the original assembly (e.g., A.dll) that is a reference assembly. If a destination assembly (e.g., B.dll) is being compiled, the destination assembly will point to (and is only aware) of the reference assembly. During runtime 804 when the program is executing, the reference to the original assembly will be recognized and, since the reference assembly has the same identifier (e.g., header file 806), the program will redirect to the actual assembly that has the implementation.

This is different from conventional systems. For example, in conventional systems, when the framework is designed, assembly B includes a reference to assembly A. At runtime, when execution of assembly B is attempted, the runtime will attempt to load the actual assembly with exactly the same name. Thus, if the reference assembly is called "a.dll", at runtime, the system will want to load "a.dll". If the name does not match exactly, the assembly would not execute (similar to a one-to-one-mapping between the reference assembly and the assembly that executes during runtime).

However, with the disclosed aspects, type forwarders are utilized such that assembly B has a reference to Assembly A, but, at run time, two (or more) assemblies are (potentially) loaded (e.g., $A_1$ and/or $A_2$). Further, facades can be utilized, wherein the facades decouple what is referenced and what is loaded.

For example, a program is written and compiled, creating an assembly that contains different portions, labeled $C_1$, $C_2$, $C_3$, $C_4$, and $C_5$. At runtime 804, $A_1$ references $C_1$, $C_2$, and $C_4$ and $A_2$ references $C_3$, $C_4$, and $C_5$. However, the portion ($C_1$, $C_2$, $C_3$, $C_4$, and $C_5$) do not have any implementation but are only platforms. The implementation is contained in $A_1$ and/or $A_2$. Thus, what is referenced when the assembly is complied is decoupled from the actual implementation from where the code resides at run time. The relationship between the assemblies and the portions are specified, but the relationship also remains flexible.

Figure 9:
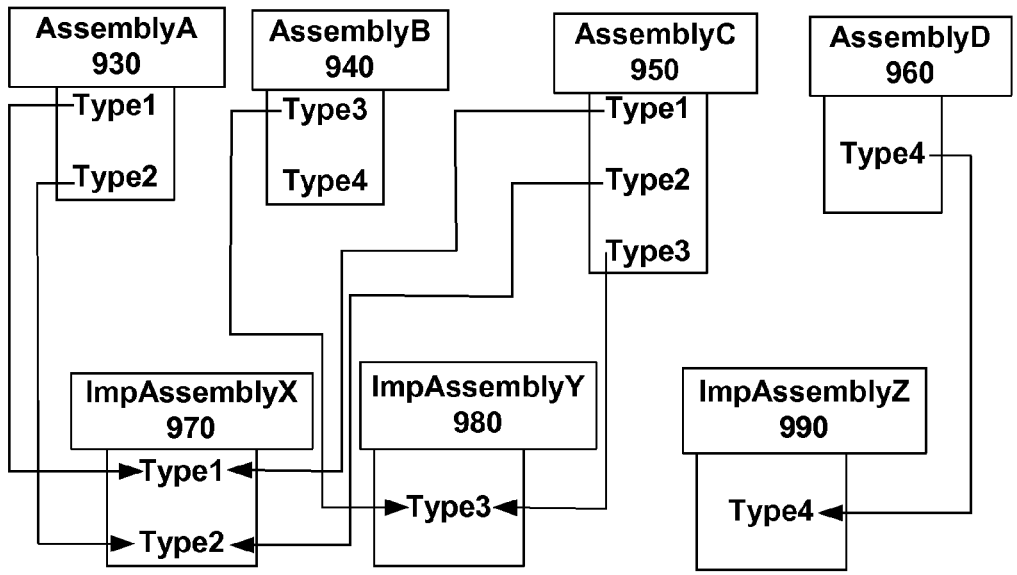
FIG. 9 is a schematic block-representation of a runtime setup and a compile time setup, according to an aspect.
Figure 9:
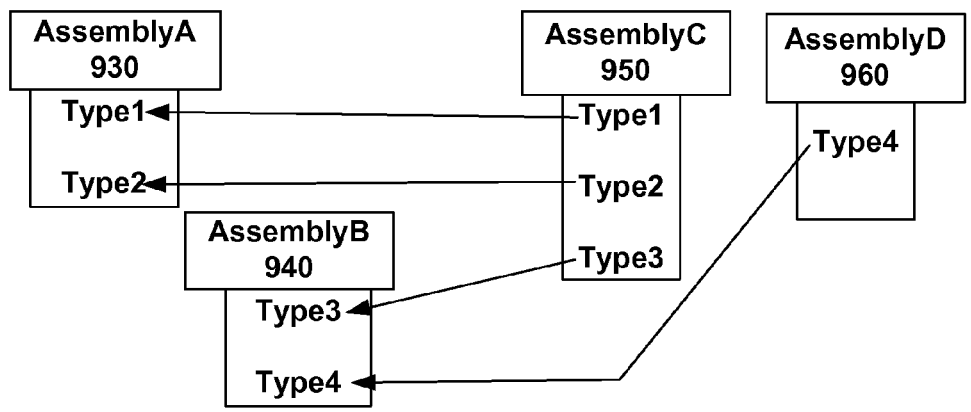

FIG. 9 illustrates a schematic block-representation of a runtime setup and a compile time setup, according to an aspect. The diagram above the dotted line represents runtime setup 910. The diagram below the dotted line represents compile time setup 920. Assembly A 930, Assembly B 940, Assembly C 950, and Assembly D 960 are type forwarding facades. Further, Assembly A 930 and Assembly B 940 form one factoring and Assembly C 950 and Assembly D 960 form a second factoring. For example, Assembly A 930 comprises two types: Type1 and Type2. Assembly B 940 comprises two types: Type3 and Type4. Assembly C 950 comprises three types: Type1, Type2, and Type3. Assembly D 960 comprises one type: Type4.

Implementation (Impl) Assemblies (Assembly X 970, Assembly Y 980, and Assembly Z 990) utilize one or more of the types, wherein the arrows indicate type forwards. For example, Impl Assembly X 970 comprises Type1 and Type2, which are forwarded from Assembly A 930 and Assembly C 950. Impl Assembly Y 980 comprises Type3, which is forwarded from Assembly B 940 and Assembly C 950. Impl Assembly Z 990 comprises Type4, which is forwarded from Assembly B 940 and Assembly D 960.

In the compile time setup 920 illustrated as Assemblies A, B, C, and D. During compile time setup 920, the first factoring is enabled to interoperate with third party binaries targeting the second factoring. Thus, Assemblies A and B are regular reference assemblies, containing metadata, while Assemblies C and D are type forward facades. Therefore, Types1 and 2 are forwarded to Assembly C from Assembly A and Type3 is forwarded from Assembly B to Assembly C. Further, Type4 is forwarded from Assembly B to Assembly D.

Figure 10:
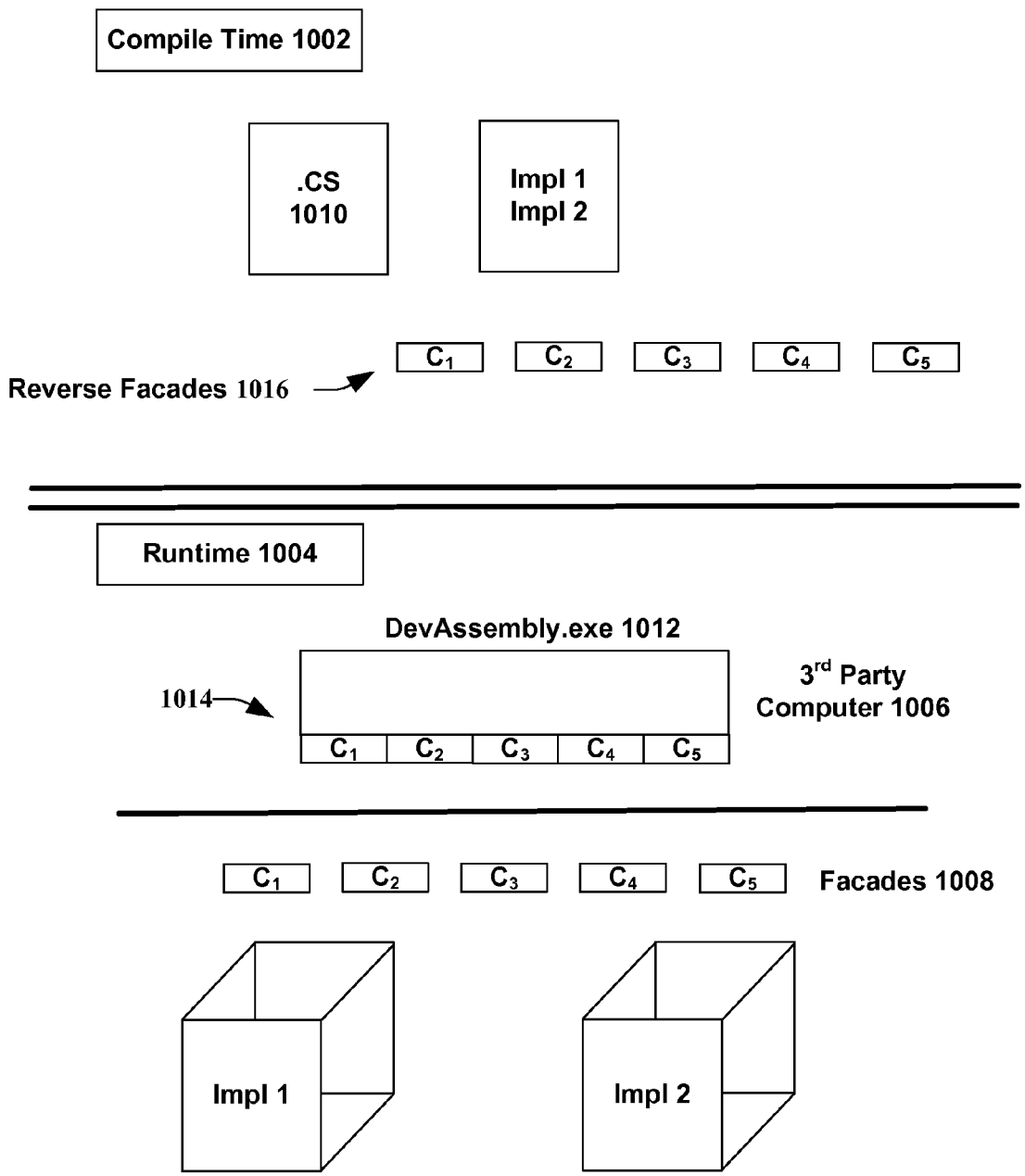
FIG. 10 is a non-limiting example of a simple architecture, according to an aspect.

FIG. 10 illustrates a non-limiting example of a simple architecture, according to an aspect. Compile time 1002 is represented above the double line and below the double line represents runtime 1004, which is divided into components, wherein a first is created by a developer (e.g., third party computer 1006) and a second are elements in a box (e.g., facades 1008). The compile time 1002 can be performed on different devices. For example, a first computer (e.g., a developer's computer) and the runtime 1004 can be performed on a second computer (e.g., a user machine). However, in accordance with some aspects, both compile time and runtime can occur on the same device.

In an example, a developer write code, such as sharp code (.cs 1010) and references assembles (e.g., framework). This results in assembly references, illustrated as reference codes $C_1$, $C_2$, $C_3$, $C_4$, and $C_5$. In accordance with some aspects, the development assembly is a program. A user installs an assembly (e.g., DevAssembly.exe 1012) and the framework utilizes implementation assemblies and the facades 1014. Also provided in the path are reverse facades 1016.

For example, at some time in the past, the assembly was compiled and the developer referenced various libraries in a set of reference assemblies. Those reference assemblies include reverse facades 1016 that map to the new surface areas (for type checking). If both reference the same types (and are included in both), the complier needs to understand that they are the same, which is achieved through type forwarding. Thus, when the framework is authored, it references the assembly (Implementation 1 and Implementation 2). The reference assemblies contain a set of metadata for they types. Further, the facades 1008 map directly to facades 1014.

The reverse facades 1016 do not have forwarders. Instead, the reverse facades are only used when it is to be mapped at runtime or compile time or when it is desired to map from one view to another view.

Figure 11:
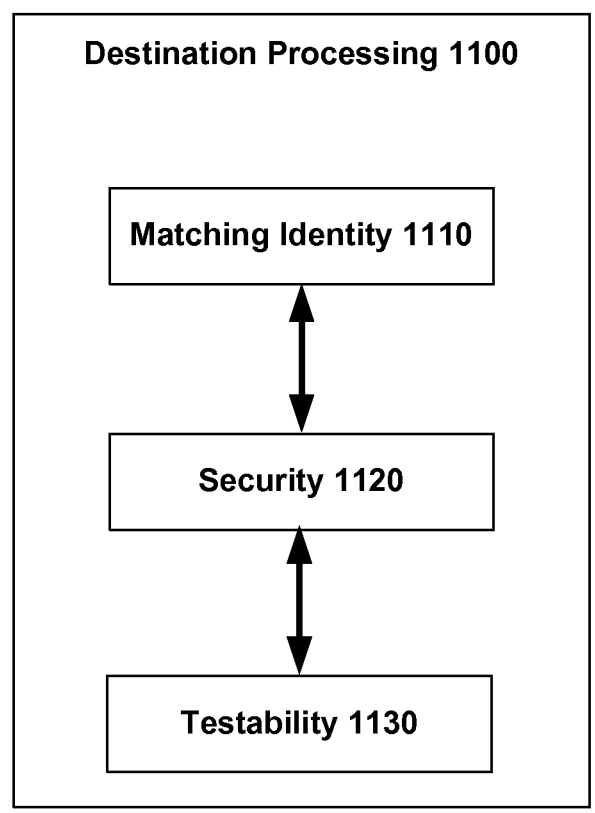
FIG. 11 is another embodiment of a destination processing component, according to an aspect.

Illustrating further aspects, FIG. 11 illustrates another embodiment of a destination processing component 1100, according to an aspect. Destination processing component 1100 comprises a matching identity component 1110, a security component 1120, and a testability component 1130.

The matching identity component 1110 is configured to detect facades that allow for the reuse of a library, source code, or other element of an original assembly. For example, a library is written that references A1 and A2. However, the writer of the library is unknown and/or is no longer available and/or the source code may not be available. Thus, if someone wants to reuse either or both A1 and A2 and/or interchange various aspects, the facades allow for the end identity of the types that are being loaded to be determined by the assembly that contains the types.

In accordance with some aspects, the facades can be utilized for different implementations. For example, a first implementation can be applied for a desktop computer, a second implementation can be applied for a cell phone, and a third implementation can be applied on another platform.

However, each of the implementations can program to the same abstraction. Thus, the facades can be utilized to correctly map to a particular platform.

The security component 1120 is configured to help ensure that the assembly identity is secure. For example, a destination assembly is calling into an original assembly (e.g., library), wherein the destination assembly (or its author/requestor) does not have rights to the original assembly. Thus, the security component 1120 can be configured to prevent changes to the original assembly, according to an aspect. Further, the security component 1120 is configured to help ensure integrity of each reference assembly.

The testability component 1130 is configured to conform what is being requested to what is being provided. Thus, if a destination assembly is referencing one or more original assemblies, the testability component 1130 can verify that the information contained in the one or more original assemblies has been tested and/or should operate as expected. Thus, if one assembly decides to delegate to a different assembly, testability component 1130 determines whether the different assembly can be trusted. In accordance with some aspects, the testability component 1130 can utilize a tamper check, a cyclic redundancy check, or another verification procedure.

Figure 12:
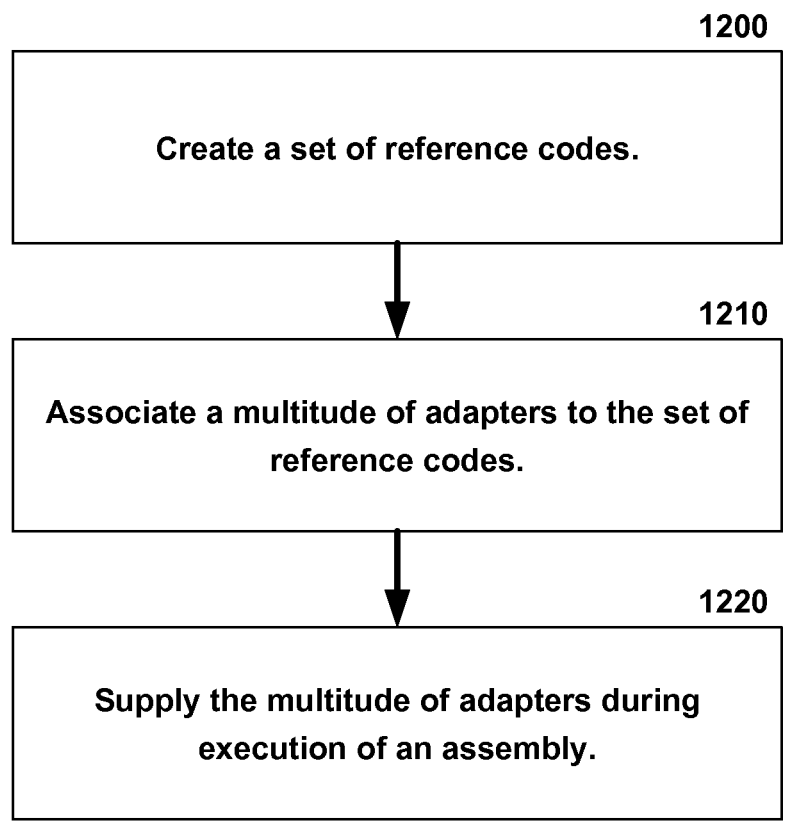
FIG. 12 is a flow diagram illustrating an exemplary non-liming process for preserving framework refactoring, according to an aspect.

FIG. 12 is a flow diagram illustrating an exemplary non-liming process for preserving framework refactoring, according to an aspect. At 1200, a set of reference codes associated with a first assembly are created. In accordance with some aspects, the creation of the reference codes can include generating a different identity for each reference code in the set of reference codes.

At 1210, a multitude of adapters are associated with the set of reference codes. The multitude of adapters are configured to forward requests for types of the first assembly. The multitude of adapters can be supplied during execution of a second assembly, at 1220.

In accordance with some aspects, the multitude of adapters are supplied at runtime. Additionally or alternatively, each adapter is associated with a different surface area and the multitude of adapters are supplied at compile time. According to some aspects, a usage of the set of reference codes is monitored and a subset of the multitude of reference codes are provided as a function of the usage.

Figure 13:
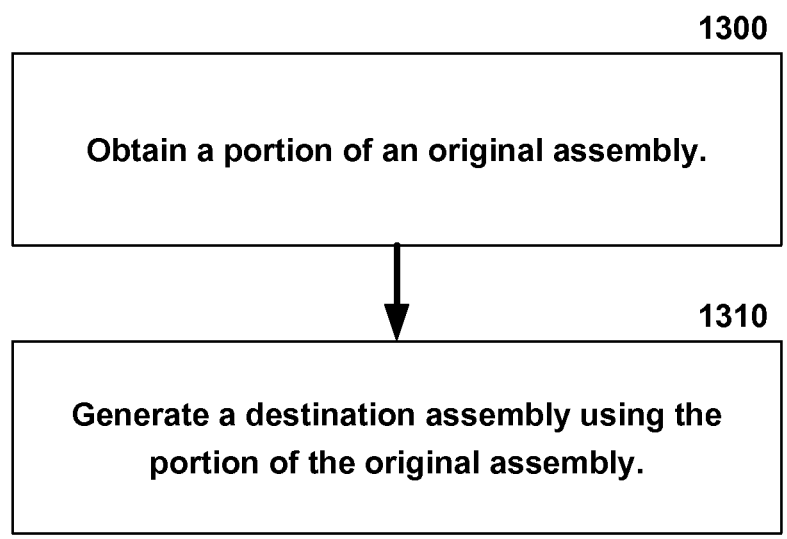
FIG. 13 is a flow diagram illustrating an exemplary non-liming process for framework refactoring compatibility.

FIG. 13 is a flow diagram illustrating an exemplary non-liming process for framework refactoring compatibility. At 1300, at least a portion of an original assembly is obtained. The portion can be obtained based on one or more reference assemblies. A destination assembly using the portion of the original assembly is generated, at 1310. The portion can comprise a type, a subset, or combinations thereof.

In accordance with some aspects, the portion of the original assembly is obtained by utilizing at least one type forward. In accordance with some aspects, the portion of the original assembly is obtained by utilizing at least one facade, wherein facades that allow for reuse of a library, a source code, or other element of the original assembly are detected. Additionally or alternatively, the process can include identifying at least one common subset of the original assembly and enabling support across at least two platforms.

Exemplary Networked and Distributed Environments

One of ordinary skill in the art can appreciate that the various embodiments of the framework systems and methods described herein can be implemented in connection with any computer or other client or server device, which can be deployed as part of a computer network or in a distributed computing environment, and can be connected to any kind of data store. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the framework creation mechanisms as described for various embodiments of the subject disclosure.

Figure 14:
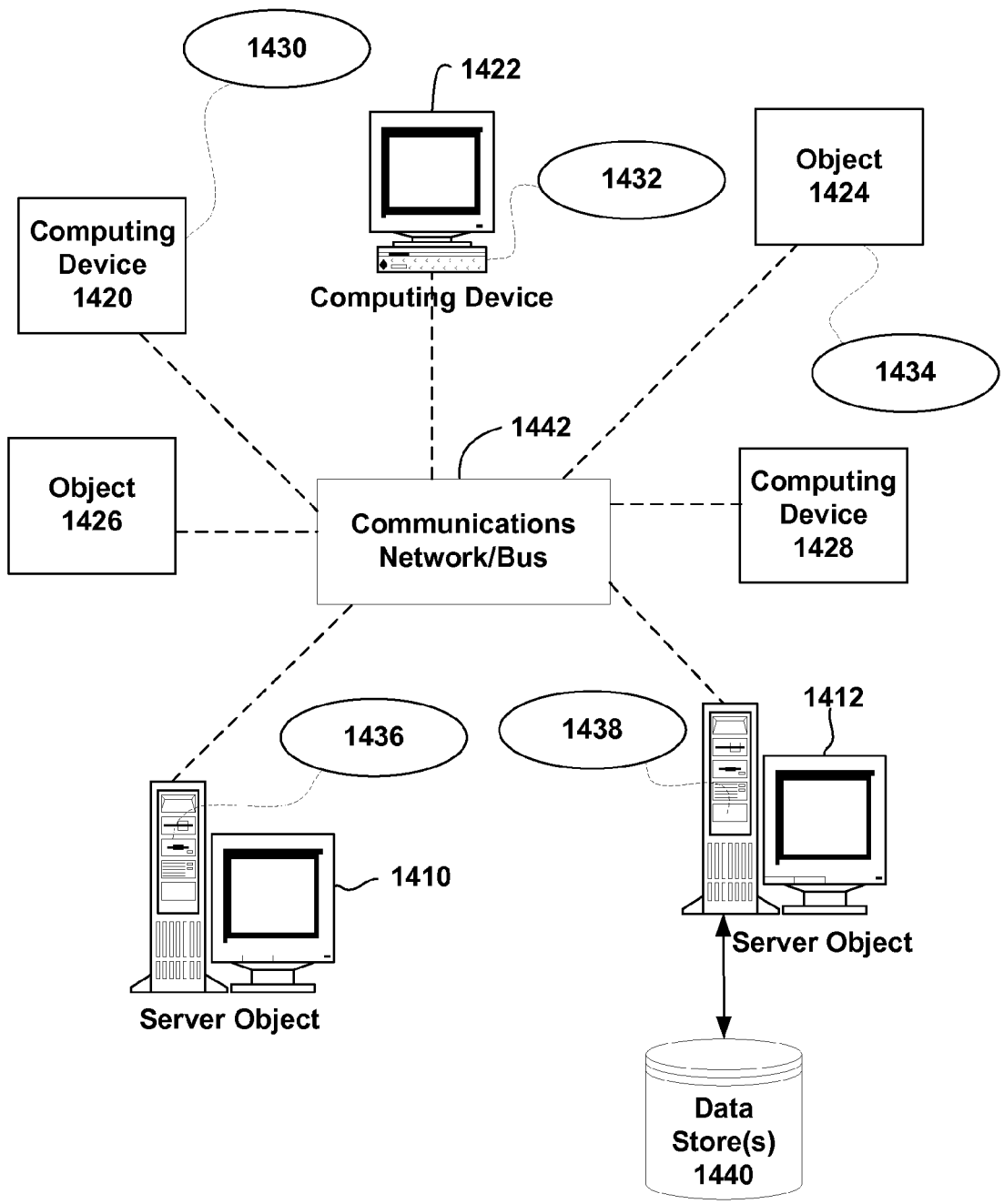
FIG. 14 is a block diagram representing exemplary non-limiting networked environments in which various embodiments described herein can be implemented.

FIG. 14 provides a schematic diagram of an exemplary networked or distributed computing environment. The distributed computing environment comprises computing objects 1410, 1412, etc. and computing objects or devices 1420, 1422, 1424, 1426, 1428, etc., which may include programs, methods, data stores, programmable logic, etc., as represented by applications 1430, 1432, 1434, 1436, 1438 and data store(s) 1440. It can be appreciated that computing objects 1410, 1412, etc. and computing objects or devices 1420, 1422, 1424, 1426, 1428, etc. may comprise different devices, such as personal digital assistants (PDAs), audio/video devices, mobile phones, MP3 players, personal computers, laptops, etc.

Each computing object 1410, 1412, etc. and computing objects or devices 1420, 1422, 1424, 1426, 1428, etc. can communicate with one or more other computing objects 1410, 1412, etc. and computing objects or devices 1420, 1422, 1424, 1426, 1428, etc. by way of the communications network 1442, either directly or indirectly. Even though illustrated as a single element in FIG. 14, communications network 1442 may comprise other computing objects and computing devices that provide services to the system of FIG. 14, and/or may represent multiple interconnected networks, which are not shown. Each computing object 1410, 1412, etc. or computing object or devices 1420, 1422, 1424, 1426, 1428, etc. can also contain an application, such as applications 1430, 1432, 1434, 1436, 1438, that might make use of an API, or other object, software, firmware and/or hardware, suitable for communication with or implementation of the framework refactoring techniques provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the framework refactoring systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 14, as a non-limiting example, computing objects or devices 1420, 1422, 1424, 1426, 1428, etc. can be thought of as clients and computing objects 1410, 1412, etc. can be thought of as servers where computing objects 1410, 1412, etc., acting as servers provide data services, such as receiving data from client computing objects or devices 1420, 1422, 1424, 1426, 1428, etc., storing of data, processing of data, transmitting data to client computing objects or devices 1420, 1422, 1424, 1426, 1428, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network 1442 or bus is the Internet, for example, the computing objects 1410, 1412, etc. can be Web servers with which other computing objects or devices 1420, 1422, 1424, 1426, 1428, etc. communicate via any of a number of known protocols, such as the hypertext transfer protocol (HTTP). Computing objects 1410, 1412, etc. acting as servers may also serve as clients, e.g., computing objects or devices 1420, 1422, 1424, 1426, 1428, etc., as may be characteristic of a distributed computing environment.

Exemplary Computing Device

As mentioned, advantageously, the techniques described herein can be applied to any device where it is desirable to perform framework creation and manipulation in a computing system. It can be understood, therefore, that handheld, portable and other computing devices and computing objects of all kinds are contemplated for use in connection with the various embodiments, i.e., anywhere that resource usage of a device may be desirably optimized. Accordingly, the below general purpose remote computer described below in FIG. 13 is but one example of a computing device.

Although not required, embodiments can partly be implemented via an operating system, for use by a developer of services for a device or object, and/or included within application software that operates to perform one or more functional aspects of the various embodiments described herein. Software may be described in the general context of computer-executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol should be considered limiting.

Figure 15:
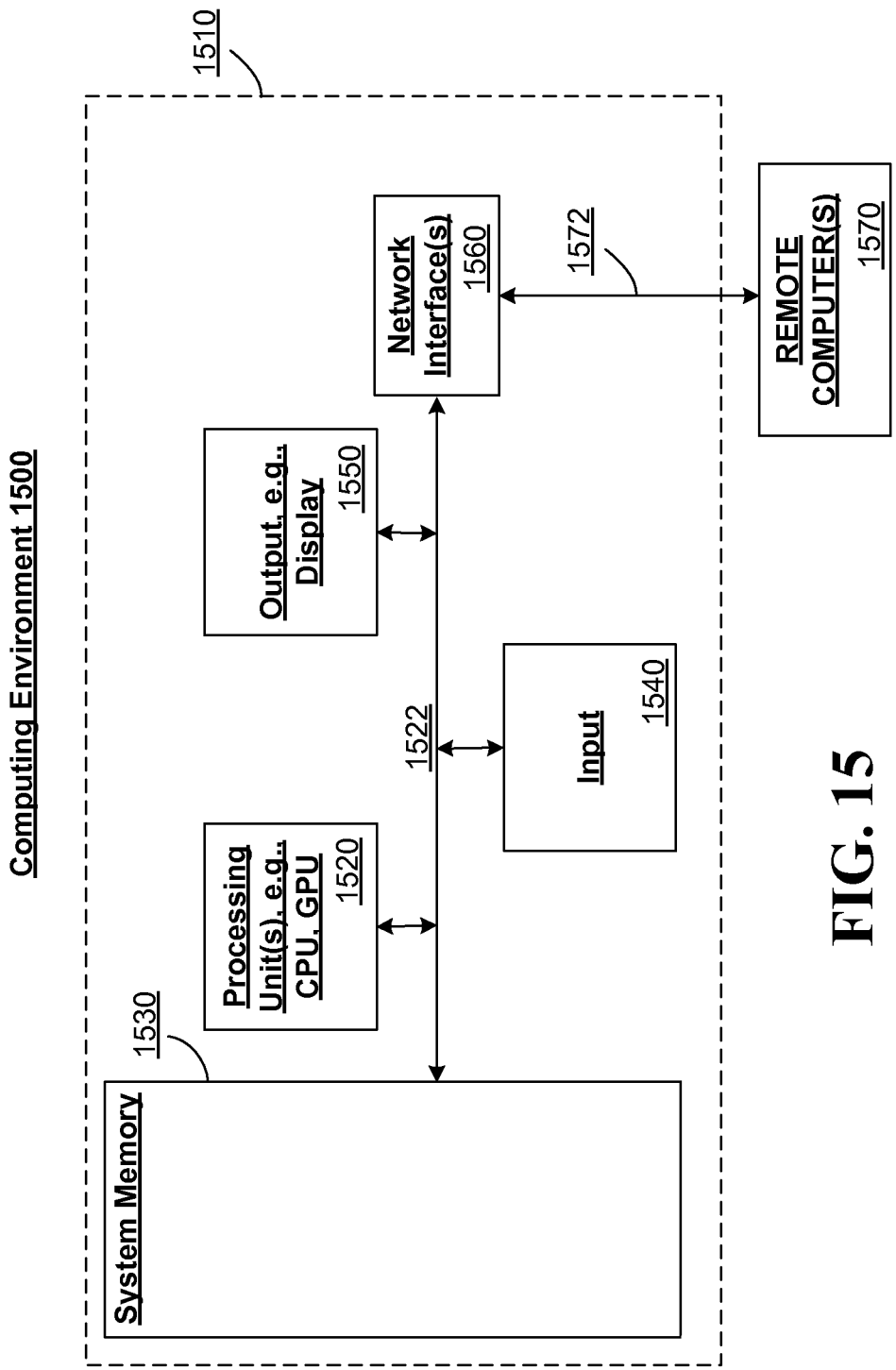
FIG. 15 is a block diagram representing an exemplary non-limiting computing system or operating environment in which one or more aspects of various embodiments described herein can be implemented.

FIG. 15 thus illustrates an example of a suitable computing system environment 1500 in which one or aspects of the embodiments described herein can be implemented, although as made clear above, the computing system environment 1500 is only one example of a suitable computing environment and is not intended to suggest any limitation as to scope of use or functionality. Neither should the computing system environment 1500 be interpreted as having any dependency or requirement relating to any one or combination of components illustrated in the exemplary computing system environment 1500.

With reference to FIG. 15, an exemplary remote device for implementing one or more embodiments includes a general purpose computing device in the form of a computer 1510. Components of computer 1510 may include, but are not limited to, a processing unit 1520, a system memory 1530, and a system bus 1522 that couples various system components including the system memory to the processing unit 1520.

Computer 1510 typically includes a variety of computer readable media and can be any available media that can be accessed by computer 1510. The system memory 1530 may include computer storage media in the form of volatile and/or nonvolatile memory such as read only memory (ROM) and/or random access memory (RAM). By way of example, and not limitation, system memory 1530 may also include an operating system, application programs, other program modules, and program data. According to a further example, computer 1510 can also include a variety of other media (not shown), which can include, without limitation, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information.

A user can enter commands and information into the computer 1510 through input devices 1540. A monitor or other type of display device is also connected to the system bus 1522 via an interface, such as output interface 1550. In addition to a monitor, computers can also include other peripheral output devices such as speakers and a printer, which may be connected through output interface 1550.

The computer 1510 may operate in a networked or distributed environment using logical connections, such as network interfaces 1560, to one or more other remote computers, such as remote computer 1570. The remote computer 1570 may be a personal computer, a server, a router, a network PC, a peer device or other common network node, or any other remote media consumption or transmission device, and may include any or all of the elements described above relative to the computer 1510. The logical connections depicted in FIG. 15 include a network 1572, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system.

In addition, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be effected across a plurality of devices. Accordingly, the invention should not be limited to any single embodiment, but rather should be construed in breadth, spirit and scope in accordance with the appended claims.

What is claimed is:

1. A framework refactoring system, comprising:
    at least one processor;
    one or more reference assemblies, each reference assembly including metadata pertaining to a subset of types, the types in the subset common to more than one platform;
    a mapping manager component configured to obtain, via a processor, a portion of an original assembly associated with a select type from the subset, based on a mapping using the metadata in the one or more reference assemblies, the mapping manager component associated with a select one of the platforms; and
    a destination processing component configured to determine, via a processor at runtime, a destination assembly using the portion of the original assembly to reference an implementation associated with the select type.

2. The framework refactoring system of claim 1, wherein the mapping manager component utilizes at least one type forward to obtain the portion of the original assembly.

3. The framework refactoring system of claim 2, wherein the at least one type forward comprises at least one facade or at least one reverse facade.

4. The framework refactoring system of claim 2, wherein the at least one type forward comprises one or more facades that hide factoring of types during run time.

5. The framework refactoring system of claim 2, further comprising:
    a platform type identifier configured to selectively apply, via a processor, the portion of the original assembly as a function of a platform on which the destination assembly is to execute.

6. The framework refactoring system of claim 1, wherein the portion of the original assembly is at least one of a type of the original assembly, a subset of the type, or combinations thereof.

7. The framework refactoring system of claim 6, further comprising:
    an observer component configured to determine, via a processor, the type or the subset is not executed by the destination assembly, wherein the destination processing component does not deliver the type or the subset at a next execution of the destination assembly.

8. The framework refactoring system of claim 6, further comprising:
    an observer component configured to monitor, via a processor, usage of the type or the subset by the destination assembly, wherein the destination processing component selectively delivers the type or the subset as a function of the usage.

9. The framework refactoring system of claim 1, further comprising:
    a leverage component configured to identify, via a processor, common subsets of the original assembly to enable support across different platforms.

10. The framework refactoring system of claim 1, further comprising:
a matching identity component configured to detect, via a processor, facades that allow for reuse of a library, source code, or other element of the original assembly.

11. The framework refactoring system of claim 1, wherein the mapping manager component obtains two portions of the original assembly from different implementation assemblies.

12. A method for preserving framework refactoring, comprising:
creating, via a processor, a set of reference codes associated with a first assembly, the set of reference codes including data describing a subset of types in the first assembly, the types in the subset common to more than one platform;
associating, via a processor, a plurality of adapters to the set of reference codes, wherein the plurality of adapters forward requests for types of the first assembly; and
supplying, via the processor, the plurality of adapters during execution of a second assembly.

13. The method of claim 12, wherein the creating comprises generating a different identity for each reference code in the set of reference codes.

14. The method of claim 12, wherein the supplying comprises supplying the plurality of adapters at runtime.

15. The method of claim 12, wherein the associating comprises referencing each adapter to a different surface area and the supplying comprise supplying the plurality of adapters at compile time.

16. The method of claim 12, wherein the supplying comprises monitoring a usage of the set of reference codes and selectively providing a subset of the set of reference codes as a function of the usage.

17. A method for framework refactoring compatibility, comprising:
providing one or more reference assemblies, each reference assembly including metadata pertaining to a subset of types, the types in the subset common to more than one platform;
obtaining, via a processor, at least a portion of an original assembly associated with a select type from the subset, based on a mapping using the metadata in the one or more reference assemblies, the mapping associated with a select one of the platforms; and
determining, via a processor at runtime, a destination assembly using the portion of the original assembly to reference an implementation associated with the select type from the subset.

18. The method of claim 17, further comprising: utilizing, via a processor, at least one type forward to obtain the portion of the original assembly.

19. The method of claim 18, wherein the utilizing comprises: utilizing, via a processor, at least one facade, and further comprising:
detecting, via a processor, the at least one facade that allows reuse of a library, source code, or other element of the original assembly.

20. The method of claim 17, further comprising:
identifying, via a processor, at least one common subset of the original assembly; and
enabling, via a processor, support across at least two platforms.

* * * * *